United States Patent
Niikawa

(10) Patent No.: US 9,083,831 B2
(45) Date of Patent: Jul. 14, 2015

(54) IMAGE FORMING APPARATUS

(71) Applicant: CANON KABUSHIKI KAISHA, Tokyo (JP)

(72) Inventor: Yusuke Niikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/227,402

(22) Filed: Mar. 27, 2014

(65) Prior Publication Data

US 2014/0293359 A1    Oct. 2, 2014

(30) Foreign Application Priority Data

Mar. 29, 2013    (JP) ................... 2013-071813
Mar. 19, 2014    (JP) ................... 2014-056388

(51) Int. Cl.
| | |
|---|---|
| H04N 1/21 | (2006.01) |
| H04N 1/23 | (2006.01) |
| H04N 1/00 | (2006.01) |
| G03G 15/00 | (2006.01) |
| G03G 21/16 | (2006.01) |

(52) U.S. Cl.
CPC ......... *H04N 1/00543* (2013.01); *G03G 15/605* (2013.01); *G03G 21/1628* (2013.01); *H04N 1/00254* (2013.01); *H04N 1/00265* (2013.01); *H04N 1/00559* (2013.01); *E05Y 2900/608* (2013.01); *G03G 21/1633* (2013.01); *H04N 1/00554* (2013.01); *H04N 2201/0063* (2013.01); *H04N 2201/0094* (2013.01)

(58) Field of Classification Search
CPC combination set(s) only.
See application file for complete search history.

(56) References Cited

U.S. PATENT DOCUMENTS

| | | | |
|---|---|---|---|
| 6,510,301 B2 * | 1/2003 | Tanaka ........................ | 399/125 |
| 7,133,626 B2 | 11/2006 | Kaiga et al. | |
| 7,418,766 B2 * | 9/2008 | Nelson et al. .................. | 16/239 |
| 7,447,466 B2 * | 11/2008 | Ikebata ......................... | 399/110 |
| 7,561,825 B2 | 7/2009 | Hirose et al. | |
| 7,804,628 B2 | 9/2010 | Hashimoto et al. | |
| 8,237,995 B2 * | 8/2012 | Yamazaki et al. ............ | 358/474 |
| 8,379,278 B2 * | 2/2013 | Kawai ........................... | 358/498 |
| 8,511,818 B2 * | 8/2013 | Nishikawa .................... | 347/108 |
| 8,514,464 B2 * | 8/2013 | Takamura et al. ........... | 358/474 |
| 8,605,300 B2 * | 12/2013 | Nagasgima et al. ......... | 358/1.13 |

(Continued)

FOREIGN PATENT DOCUMENTS

| | | | |
|---|---|---|---|
| JP | 2005-189552 A | 7/2005 | |
| JP | 2009-053315 A | 3/2009 | |

(Continued)

*Primary Examiner* — Richard Zhu
(74) *Attorney, Agent, or Firm* — Fitzpatrick, Cella, Harper & Scinto

(57) ABSTRACT

An image forming apparatus includes an image forming portion; an image reader movable between a first open position and a first closed position; an openable member movable between a second open position and a second closed position; and a supporting member. When the image reader is located at the first open position, the openable member is supported at the second open position by the supporting member. When the image reader is moved from the supported state toward the first closed position, closing of the openable member from a predetermined position closer to the second closed position than the second open position is limited by the supporting member. When the image reader is moved toward the first closed position from a limited state in which the closing of the openable member is limited by the supporting member, limitation of the openable member by the supporting member is eliminated.

22 Claims, 12 Drawing Sheets

(56) References Cited

U.S. PATENT DOCUMENTS

| | | | |
|---|---|---|---|
| 8,655,226 B2* | 2/2014 | Nishimura et al. | 399/125 |
| 8,699,919 B2* | 4/2014 | Takamori | 399/125 |
| 2006/0222435 A1* | 10/2006 | Ha et al. | 400/691 |
| 2007/0098440 A1* | 5/2007 | Ikebata | 399/119 |
| 2010/0315658 A1 | 12/2010 | Niikawa | |

FOREIGN PATENT DOCUMENTS

| | | |
|---|---|---|
| JP | 2009-108617 A | 5/2009 |
| JP | 2011-018038 A | 1/2011 |

* cited by examiner (a)

(b)

(a)

(b)

IMAGE FORMING APPARATUS

FIELD OF THE INVENTION AND RELATED ART

The present invention relates to an image forming apparatus and particularly relates to a multi-function machine including an image reading portion above an image forming portion.

A copying machine including the image reading portion above the image forming portion and including a discharge space, between the image forming portion and the image reading portion, in which a recording sheet (material) is to be discharged has been known. Such a copying machine is generally constituted so that the inside of the image forming portion can be exposed in order to perform troubleshooting at the image forming portion or maintenance such as cleaning of the inside of the image forming portion or exchange of consumable parts.

In such a conventional image forming apparatus, a door (openable member) rotatably movable (rotatable) upward relative to the image forming portion in order to expose the inside of the image forming portion is provided, and this door is disposed at an upper portion of the image forming portion due to constraints of arrangement of various constitutional elements at the image forming portion. Further, the image reading portion is disposed above the image forming portion via the recording sheet discharge space and is provided rotatably upward so as to open and close the image forming portion.

This door is provided, in many cases, with a link mechanism, operable in interrelation with rotation of the door, for urging the door in a closing direction during the rotation of the door from an open position to a closed position. The link mechanism also functions as, e.g., a pressure releasing mechanism for a fixing unit.

When a maintenance operation of the inside of the image forming apparatus is performed, there is a need to limit the door and support it in an unclosable manner in an exposed state of the inside of the image forming portion.

In a small-sized copying machine, a space between the image reading portion and a discharge-mounting portion is narrow, and therefore when a recording material which is short with respect to a feeding direction is passed through the fixing unit, in order to easily take the recording material out, it is desirable that the image reading portion is exposed, while the door is closed, thereby to permit access to the discharge-mounting portion.

Further, it is desirable that a user can close the door and the image reading portion by rotating the image reading portion from the state in which the image reading portion and the door are supported and limited so as not to be closed.

For this purpose, Japanese Laid-Open Patent Application (JP-A) 2011-18038 discloses a constitution in which a limiting means for limiting a door so as not to be closed only when the image reading portion is located at an open (exposed) position is provided.

At the image reading portion in such a conventional image forming apparatus, it becomes possible to open (expose) and support both the door and the image reading portion in order to permit access to an inside of an image forming portion and possible to open and support only the image reading portion while closing the door in order to easily take the recording material out. Further, from a state in which both the door and the image reading portion are open, by rotating the image reading portion, both the door and the image reading portion can be closed.

However, in the conventional image forming apparatus, when the image reading portion is rotated from the state in which both the door (openable member) and the image reading portion are open, limit is made so as not to close the door only when the image reading portion is located at the open state, and therefore the door falls freely from a state in which the door is substantially fully open.

For this reason, the door is vigorously closed, so that there was a problem such that impact and noise when the door is closed were large.

SUMMARY OF THE INVENTION

A principal object of the present invention is to provide an image forming apparatus capable of reducing a degree of impact and noise when an openable member is closed even in the case where an image reading portion is rotated from a state in which both the openable member and the image reading portion are exposed (open).

One aspect of the present invention is to provide an image forming apparatus comprising: an image forming portion for forming an image on a recording material; an image reading portion for reading an original image, wherein the image reading portion is movable between a first open position where the image reading portion is open to the image forming portion and a first closed position where the image reading portion is closed to the image forming portion; an openable member movable between a second open position where the openable member opens an inside of the image forming portion and a second closed position where the openable member is closed to the image forming portion; and a supporting member for supporting the openable member, wherein when the image reading portion is located at the first open position, the openable member is supported at the second open position by the supporting member, wherein when the image reading portion is moved toward the first closed position from a state in which the openable member is supported at the second open position by the supporting member, closing of the openable member from a predetermined position which is between the second open position and the second closed position and which is closer to the second closed position than the second open position is limited by the supporting member, and wherein when the image reading portion is moved toward the first closed position from a state in which the closing of the openable member from the predetermined position is limited by the supporting member, limitation of the openable member by the supporting member is eliminated.

Another aspect of the present invention is to provide an image forming apparatus comprising: an image forming portion for forming an image on a recording material; an image reading portion for reading an original image, wherein the image reading portion is movable between a first open position where the image reading portion is open to the image forming portion and a first closed position where the image reading portion is closed to the image forming portion; an openable member movable between a second open position where the openable member opens an inside of the image forming portion and a second closed position where the openable member is closed to the image forming portion; a supporting member for supporting the openable member; and urging means for urging the openable member in a closing direction in at least a part of a process in which the openable member is moved from the second open position to the second closed position, wherein when the image reading portion is located at the first open position, the openable member is supported at the second open position by the supporting member, wherein when the image reading portion is moved toward the first closed position from a state in which the openable member is supported at the second open position by the supporting member, and wherein when the image reading portion is moved toward the first closed position from a state in which the closing of the openable member from the predetermined position is limited by the supporting member, limitation of the openable member by the supporting member is eliminated, and wherein a position where an urging force for urging the openable member in the closing direction by the urging means is maximum is located between the predetermined position and the second open position.

These and other objects, features and advantages of the present invention will become more apparent upon a consideration of the following description of the preferred embodiments of the present invention taken in conjunction with the accompanying drawings.

DESCRIPTION OF THE EMBODIMENTS

With reference to the drawings, embodiments of the present invention will be described in detail. However, dimensions, materials, shapes and relative arrangements of constituent elements described in the following embodiments should be appropriately changed depending on constitutions of apparatuses to which the present invention is applied and depending on various conditions, and thus the scope of the present invention is not limited to the following embodiments.

<First Embodiment>

(Image Forming Apparatus)

An image forming apparatus in this embodiment according to the present invention will be described.

Figure 1:
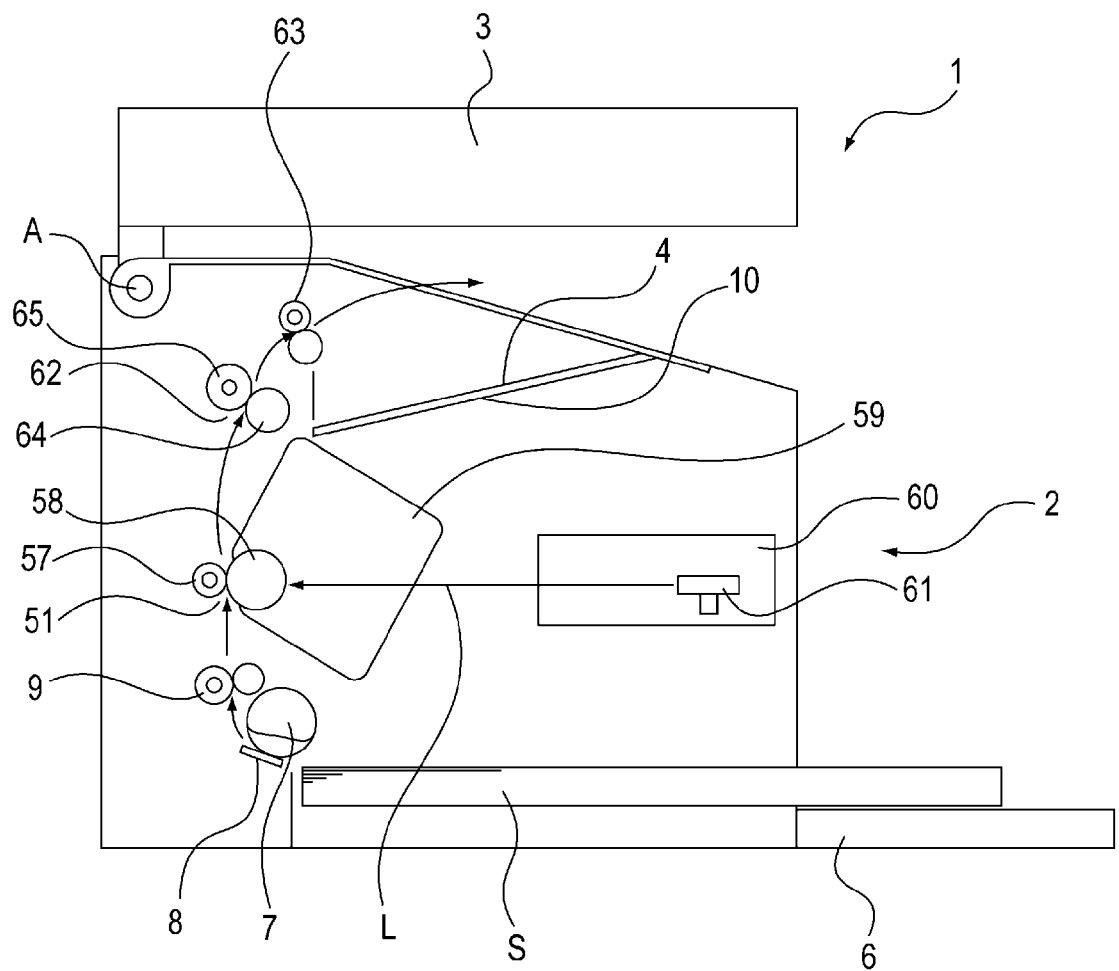
FIG. 1 is a schematic view of an inside structure of an image forming apparatus in First Embodiment of the present invention.
Figure 2:
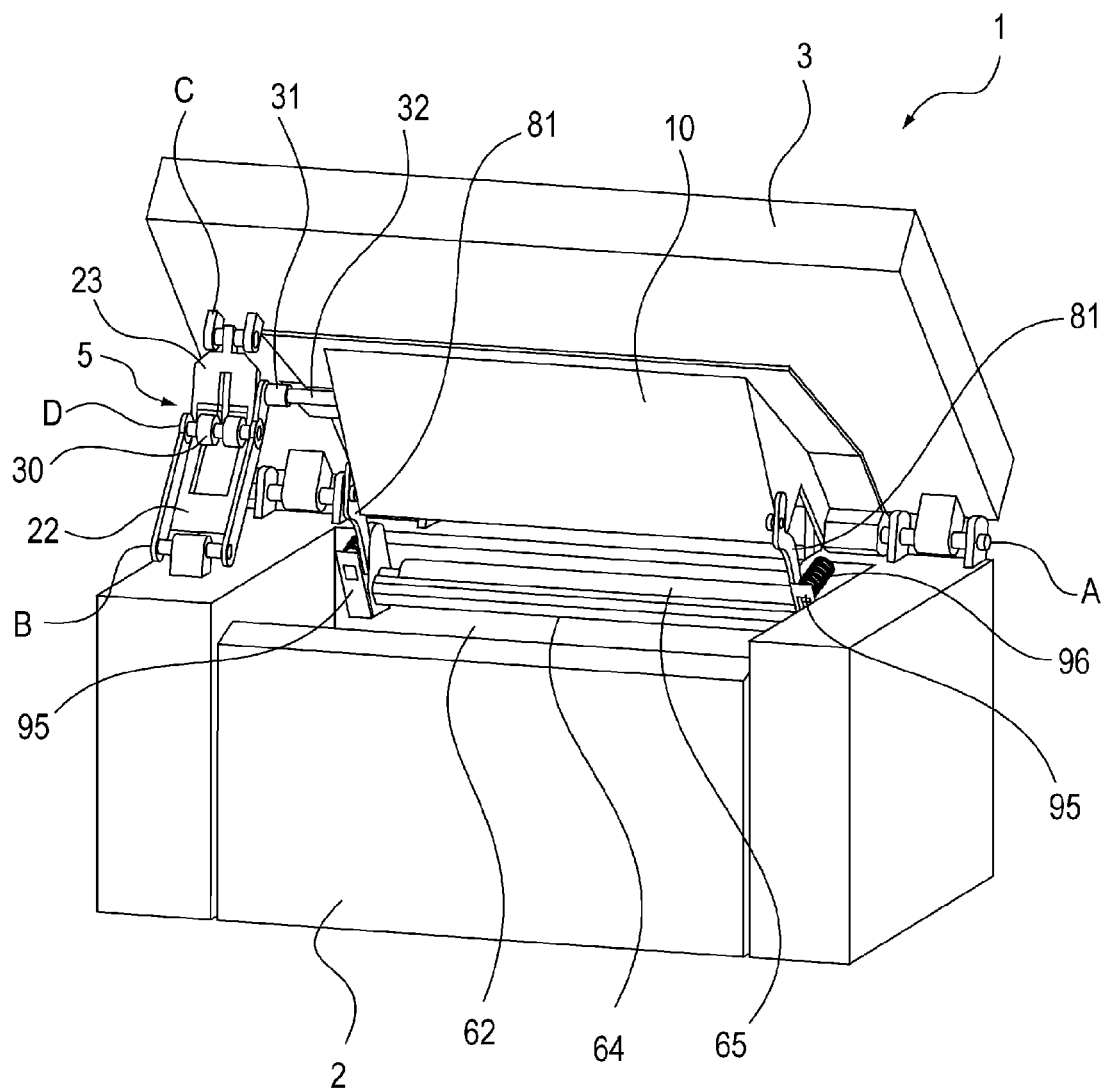
FIG. 2 is a perspective view of the image forming apparatus shown in FIG. 1.

FIG. 1 is a schematic view showing an inside structure of the image forming apparatus in this embodiment. FIG. 2 is a perspective view of the image forming apparatus shown in FIG. 1.

As shown in FIGS. 1 and 2, an image forming apparatus 1 includes a printer portion 2 (image forming portion) for forming an image and a scanner portion 3 (image reading portion) for reading an original image.

The image forming apparatus 1 forms an image at the printer portion 2 depending on image information from an external device (not shown) such as a host computer communicatably connected thereto or depending on original image information read by the scanner portion 3. Further, the image forming apparatus 1 also functions as a scanner device for sending the original image information read by the scanner portion 3 to the external device communicatably connected thereto. The scanner portion 3 is located above the printer portion 2 and is disposed in a state in which the scanner portion 3 and the printer portion 2 sandwich a discharge-mounting portion 4. Further, the scanner portion 3 is attached to the printer portion 2 so as to be rotationally openable (rotatable) about a rotation center A provided at a rear portion. Further, a scanner link member 5 for connecting the printer portion 2 and the scanner portion 3 with each other is provided.

Next, a structure of the printer portion 2 will be described. A recording material (medium) S stacked in a (sheet) feeding tray 6 is separated and fed one by one by a (sheet) feeding roller 7 and a sheet separating means 8 on the basis of a print signal from the host computer (not shown). The separated recording material S is fed to a transfer portion 51 by a feeding roller pair 9. The transfer portion 51 includes a process cartridge 59 and a transfer roller 57. Incidentally, the process cartridge 59 is assembled into a unit, which is detachably mountable to the printer portion 2.

The process cartridge 59 includes a photosensitive drum 58 for forming a toner image on a surface thereof. Further, although illustration will be omitted, process cartridge 59 includes a charger for electrically charging the photosensitive drum 58, a developing device for developing a latent image on the photosensitive drum 58 with a toner, a cleaner for removing and collecting a residual toner on the photosensitive drum 58, and the like. A laser scanner unit 60 includes a polygonal mirror 61 for reflecting laser light so that the surface of the photosensitive drum 58 is scanned with the laser light. Further, although illustration will be omitted, the laser scanner unit 60 includes a rotating motor for rotating the polygonal mirror 61, a laser unit for generating the laser light, and the like.

The discharge-mounting portion 4 is provided on an upper surface of a door 10. Further, the door 10 is disposed, on the printer portion 2, rotationally openable about a rotation center coaxial with the rotation center A of the scanner portion 3. Further, the door 10 is opened relative to a main body of the printer portion 2, whereby an inside of the printer portion 2 can be exposed, so that it becomes possible to perform an exchange of the process cartridge 59 and jam clearance of the recording material S.

(General Operation of Image Forming Apparatus)

Laser light L based on the image information is emitted from the laser scanner unit 60 to the photosensitive drum 58, and thus the surface of the photosensitive drum 58 is exposed to the laser light L, so that the latent image is formed on the photosensitive drum 58. This latent image is developed with the toner (developer) by the developing device. The toner image obtained by the development is transferred from the photosensitive drum 58 onto the fed recording material S by a transfer roller 57. Thereafter, the photosensitive drum 58 is cleaned by the cleaner by removing the residual toner from the photosensitive drum 58. The recording material S after completion of the toner image transfer is fed into a fixing unit 62, in which the transferred toner image is heat-fixed. The fixing unit 62 is constituted by a heating unit 64, in which a fixing heater and a fixing film are incorporated, and a pressing roller 65 press-contacted to the heating unit 64.

(Rotation Opening and Closing Mechanism for Scanner Portion and Door)

A rotatable opening and closing mechanism for the scanner portion 3 and the door 10 will be described with reference to FIGS. 2 to 5.

Figure 3:
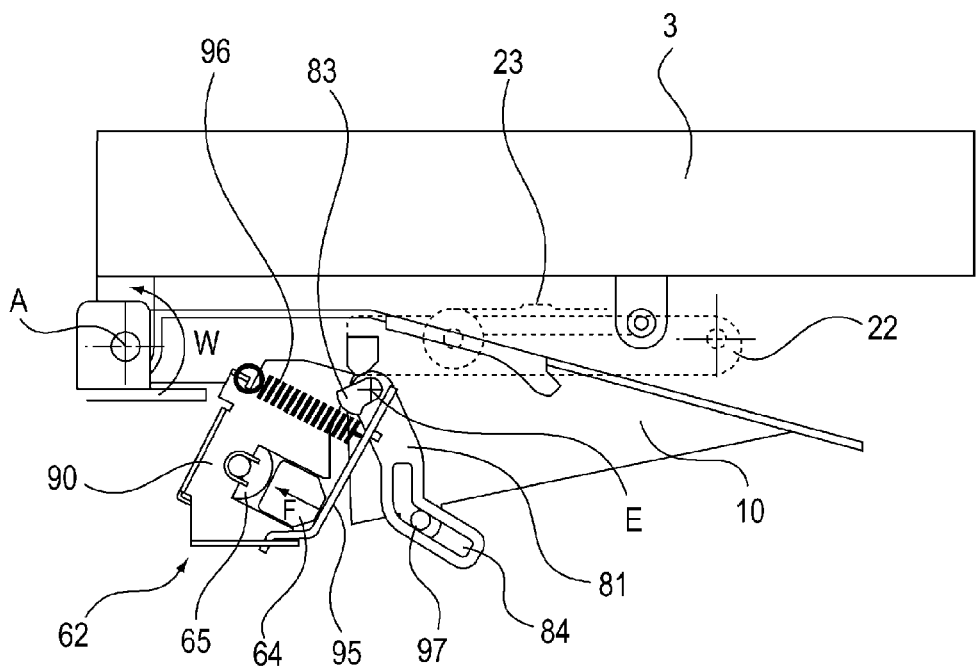
In FIG. 3, (a) and (b) are schematic views showing a rotatable opening and closing mechanism for a scanner portion and a door in First Embodiment.
Figure 3:
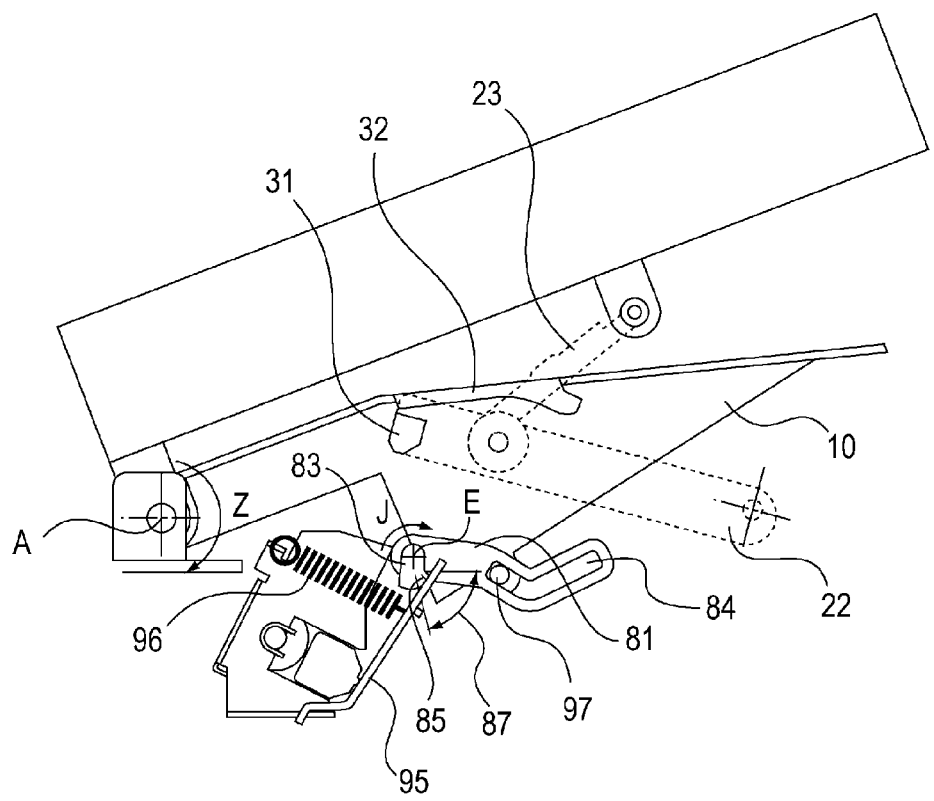
Figure 4:
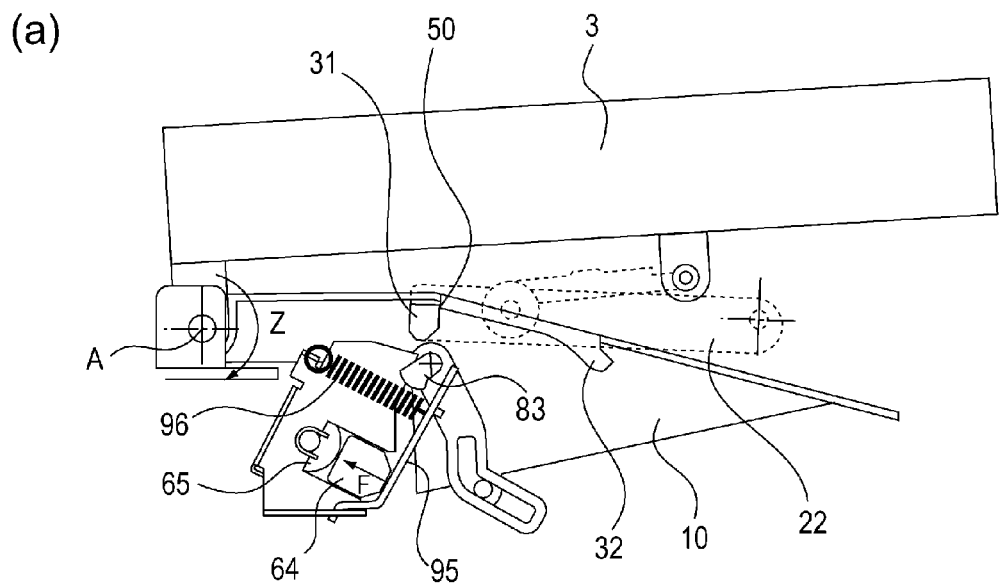
In FIG. 4, (a) and (b) are schematic views showing the rotatable opening and closing mechanism for the scanner portion and the door in First Embodiment.
Figure 4:
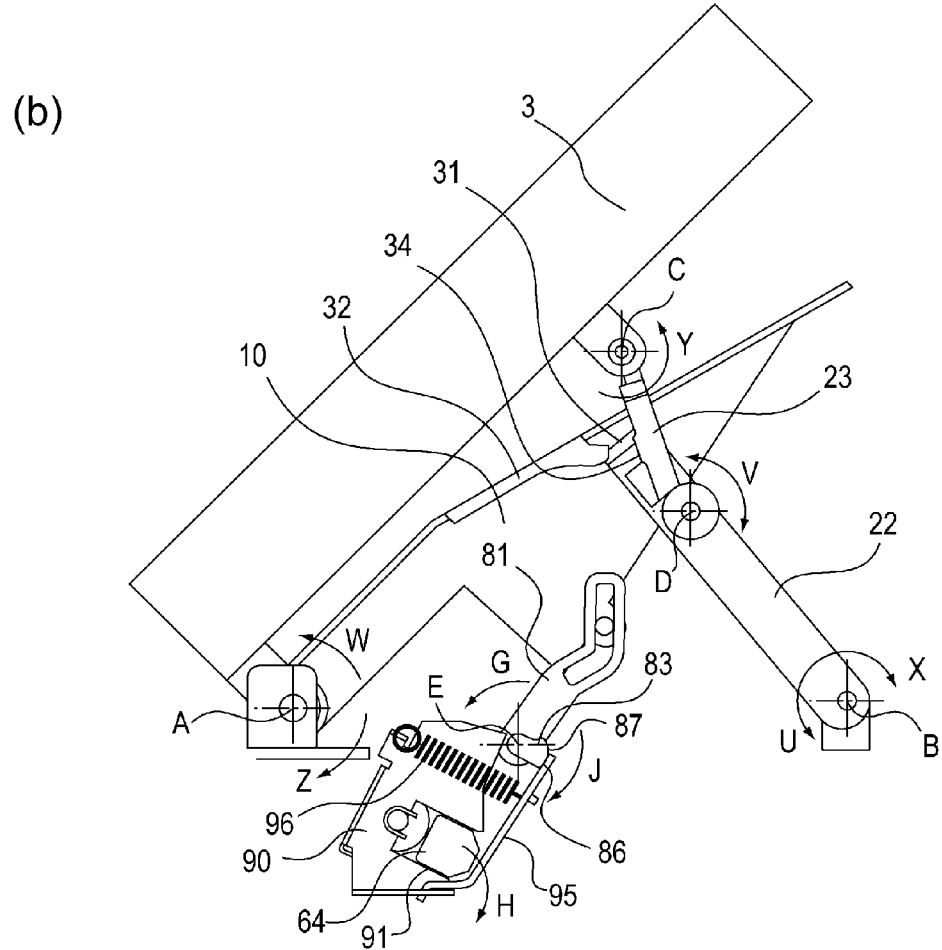

FIGS. 3 and 4 are schematic views showing the rotatable opening and closing mechanism for the scanner portion 3 and the door 10. In FIG. 3, (a) shows the rotatable opening and closing mechanism in a state in which the scanner portion 3 and the door 10 are closed, and (b) shows the rotatable opening and closing mechanism in a state in which the scanner portion 3 and the door 10 are approximately halfway open. In FIG. 4, (a) shows the rotatable opening and closing mechanism in a state immediately before the scanner portion 3 and the door 10 are closed, and (b) shows the rotatable opening and closing mechanism in a state in which the scanner portion 3 and the door 10 are completely open.

As shown in FIG. 2, a scanner link member 5 (link member) for connecting the printer portion 2 and the scanner portion 3 with each other is principally constituted by a lower link 22, and upper link 23 and a torsion coil spring 30.

The lower link 22 is mounted to the printer portion 2 so as to be rotatable about a rotation center B as an axis. On the other hand, the upper link 23 is mounted to the scanner portion 3 so as to be rotatable about a rotation center C as an axis. These lower and upper links 22 and 23 are rotatably joined to each other about a rotation center D as a shaft. For this reason, the scanner portion 3, the printer portion 2, the lower link 22 and the upper link 23 constitute a quadric link.

The torsion coil spring 30 illustrated in FIG. 2 is mounted, as shown in (b) of FIG. 4, so as to urge the lower link 23 and the upper link 23 in a direction V about the rotation center D as the shaft. Further, in order to limit rotation of the lower link 22 and the upper link 23 in a predetermined amount or more by the torsion coil spring 30, the lower link 23 is provided with a rotation preventing (stopping) portion 34, and the rotation preventing portion 34 contacts the upper link 23, so that the lower link 22 and the upper link 23 are prevented from rotating in the predetermined amount or more.

Figure 5:
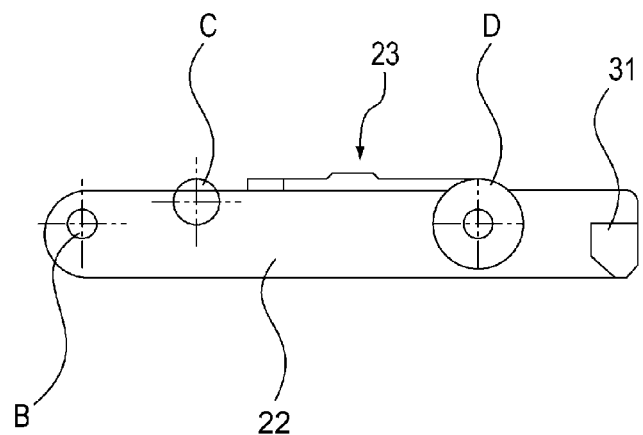
In FIG. 5, (a) and (b) are schematic views each showing components of the rotatable opening and closing mechanism in First Embodiment.
Figure 5:
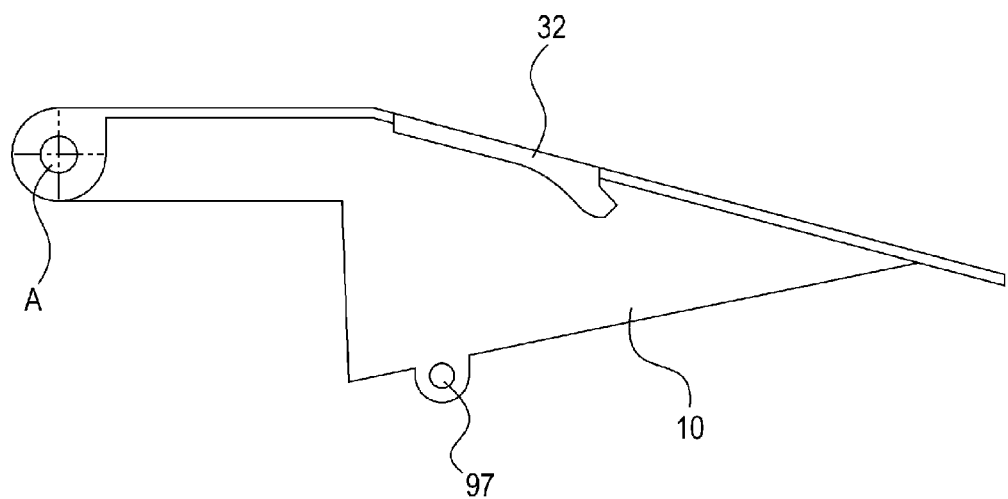

In FIG. 5, (a) and (b) are schematic views each showing components of the rotatable opening and closing mechanism. In FIG. 5, (a) shows a structure of the lower link 22 and the upper link 23, and (b) shows a structure of the door 10.

As shown in (a) of FIG. 5, at an end of the lower link 23 in a side opposite from the rotation center B, a projection 31 (limiting portion or supporting portion) projected in a direction of the door 10 is provided. On the other hand, as shown in (b) of FIG. 5, on a side surface of the door 10, a guide 32 (limited portion or supported portion) projected in a direction of the lower link 22 is provided. Further, as shown in FIGS. 3 and 4, a constitution in which the guide 32 is supported by the projection 31 during an opening and closing operation is employed.

(Pressure-Releasing Mechanism of Fixing Unit)

Next, a pressure-releasing mechanism of the fixing unit 62 will be described.

Figure 6:
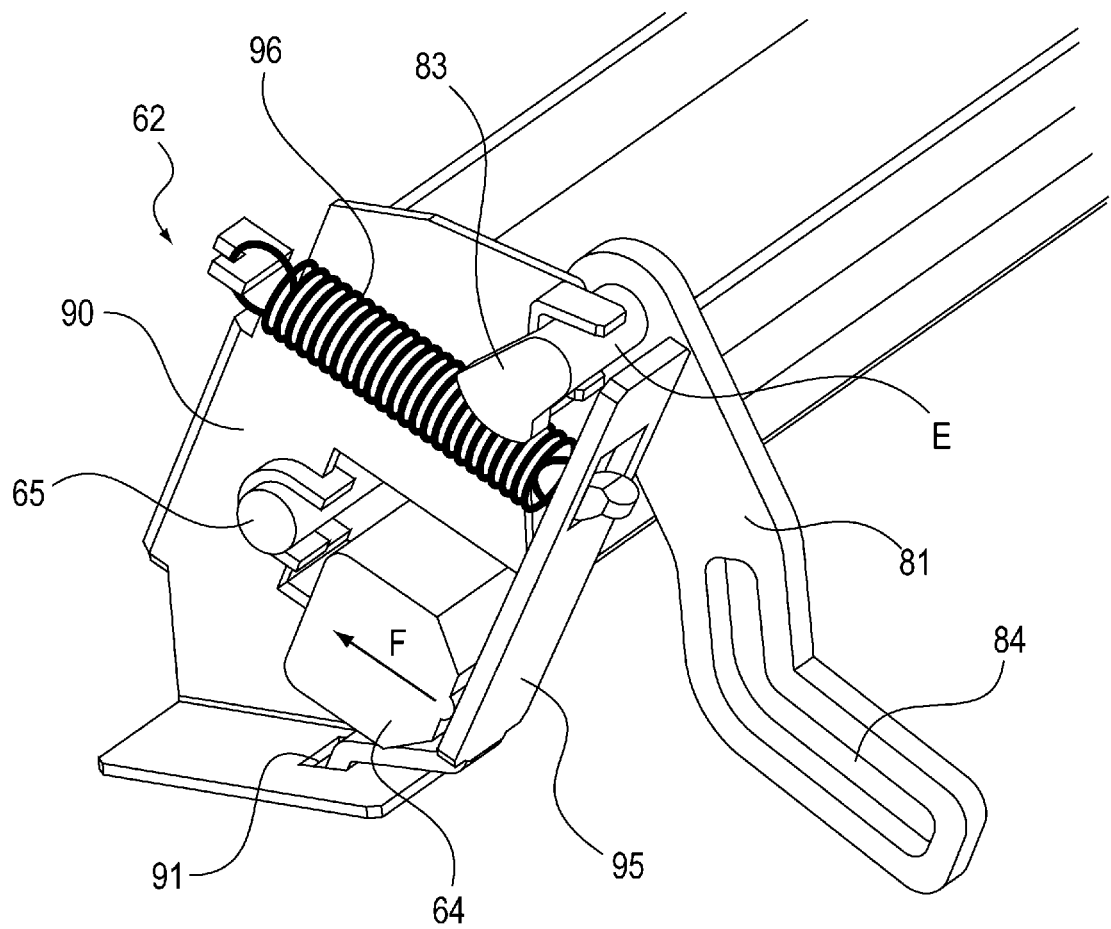
FIG. 6 is a perspective view showing a fixing unit in First Embodiment.

FIG. 6 is a perspective view showing a fixing unit 62.

As shown in FIG. 6, the fixing unit 62 includes, at each of end portions thereof with respect to a widthwise direction of the recording material S perpendicular to a feeding direction of the recording material S, a pressing plate 95, a pressing spring 96, a pressure-releasing lever 81 and the like. Incidentally, the pressing spring 96 and the pressure-releasing lever 81 constitute an urging means.

An end portion of the pressing plate 95 is engaged with a mounting hole 91 provided in a fixing frame 90, so that the pressing plate 95 is rotatable about the end portion as a center.

The pressing spring 96 is mounted to the fixing frame 90 at an end thereof and is mounted to the pressing plate 95 at the other end thereof, and presses the heating unit 64 in an arrow H direction via the pressing plate 95. As a result, nip pressure is applied to a nip between the heating unit 64 and the pressing roller 65.

Further, the pressure-releasing lever 81 is shaft-supported, by the fixing frame 90, rotatably about a rotation center E as a center, and is provided with a cam portion 83 for performing an operation for raising the pressing plate 95 by rotation thereof.

Figure 7:
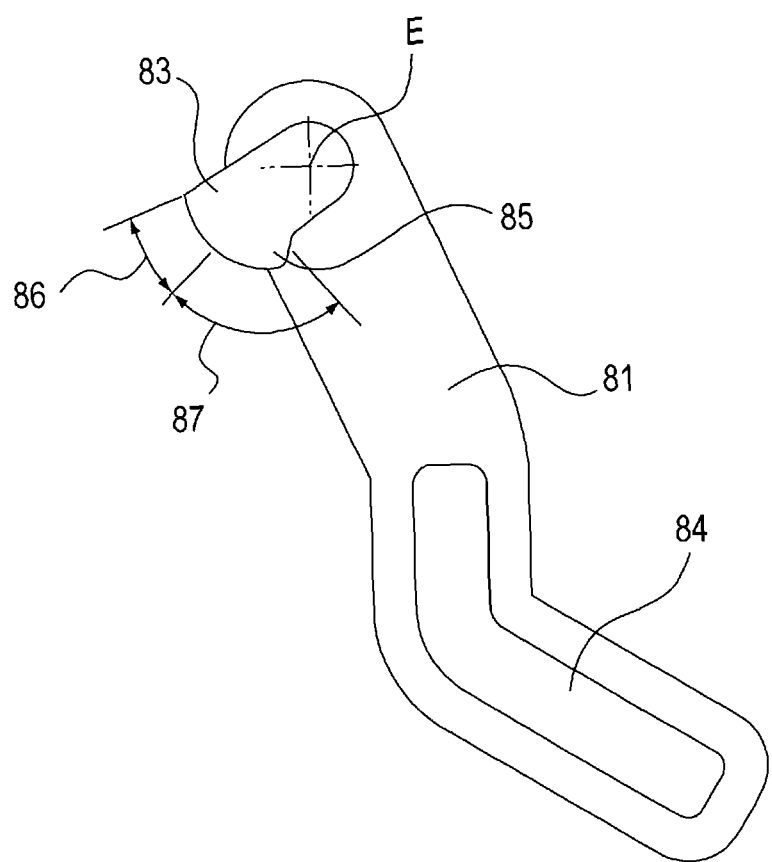
FIG. 7 is a schematic view showing a structure of a pressure releasing lever in First Embodiment.

FIG. 7 is a schematic view showing a structure of the pressure-releasing lever 81.

As shown in FIG. 7, the cam portion 83 has a cam surface 87 for raising the pressing plate 95 and an arcuate cam surface 86 concentric with the rotation center E. On the cam surface 87, there is a point 85 where a maximum force is required when the pressing plate 95 is raised.

Further, the pressure-releasing lever 81 is provided with a lever groove 84 formed in an elongated hole shape, and the lever grove 84 is engaged with a projection 97 ((b) of FIG. 5) provided on a side surface of the door 10. For that reason, the pressure-releasing lever 81 performs a rotation operation about the rotation center E in the same direction as the rotation direction of the door 10 in interrelation with an opening and closing operation of the door 10.

Incidentally, when the door 10 is closed as shown in (a) of FIG. 3, the cam portion 83 of the pressure-releasing lever 81 does not contact the pressing plate 95, and by a pressing force by the pressing plate 95, the heating unit 64 is urged so as to be placed in a pressing state in which the pressure is applied to the pressing roller 65.

(Rotation Opening and Closing Operation of Scanner Portion and Door)

A rotation opening and closing operation of the scanner portion 3 and the door 10 and a pressure-releasing operation of the fixing unit 62 will be described.

The scanner portion 3 is rotatable between a closed position (first closed position in (a) of FIG. 3) where the scanner portion 3 is closed to the printer portion 2 and open position (first open position in (b) of FIG. 4) where the scanner portion 3 is completely open to the printer portion 2. On the other hand, also the door 10 is rotatable between a closed position (second closed position in (a) of FIG. 3) where the door 10 is closed to the printer portion 2 and an open position (second open position in (b) of FIG. 4) where the door 10 is open to the printer portion 2.

As shown in (a) of FIG. 3, during a steady-state operation, the scanner portion 3 is in a state in which the scanner portion 3 is closed to the printer portion 2. Further, in order to perform the exchange of the process cartridge 59 and the jam clearance of the recording material S, there is a need to open (expose) the inside of the printer portion 2. Further, when the image forming apparatus 1 is stopped in a state in which the recording material S extends over the nip of the fixing unit 62, in order to easily perform the jam clearance, there is a need to release (eliminate) the nip pressure of the fixing unit 62. For that purpose, first, the scanner portion 3 is raised and supported in an open state, and thereafter the door 10 is raised and supported in an open state.

(Scanner Portion Supporting Operation in Open State)

An operation for supporting the scanner portion 3 in the open state by raising the scanner portion 3 will be described.

When the scanner portion 3 is raised, as shown in (b) of FIG. 4, the scanner portion 3 is rotated about the rotation center A in an arrow W direction. With this rotation, the lower link 22 and the upper link 23 are rotated, as the quardric link, about the rotation center B in an arrow X direction and about the rotation center C in an arrow Y direction, respectively. Then, when each of the lower link 22 and the upper link 23 is rotated in a predetermined amount, the upper link 23 abuts against the rotation preventing portion 34 provided to the lower link 22, so that motion of the quardric link is stopped. A position of the scanner portion 3 at this time is a position in the open state. Further, by the torsion coil spring 30 mounted to the scanner link member 5, a force for opening the lower link 22 and the upper link 23 in the direction V is applied to the links 22 and 23, so that the open state of the scanner portion 3 is supported (maintained) by propping the links 22 and 23 against the scanner portion 3.

(Door Supporting Operation in Open State)

An operation for supporting the door 10 in the open state will be described.

Figure 8:
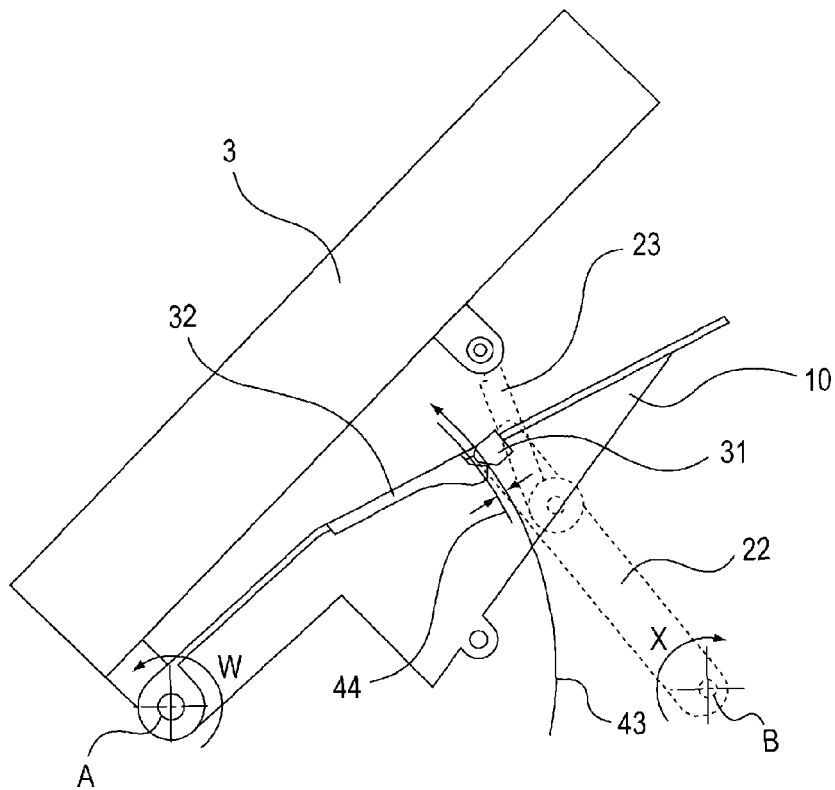
In FIG. 8, (a) and (b) are schematic views showing an operation in the case of opening and supporting a door in First Embodiment.
Figure 8:
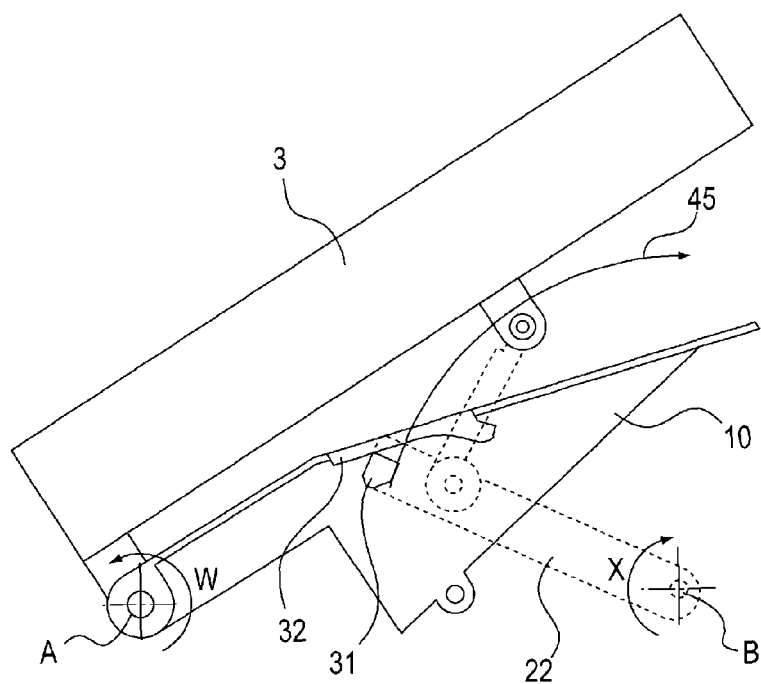

In FIG. 8, (a) and (b) are schematic views for illustrating the operation in the case of opening and supporting the door 10. In FIG. 8, (a) shows a state in which the door 10 is raised in the case where the scanner portion 3 is in the open state, and (b) shows a state in which the scanner portion 3 is halfway closed from a state in which the scanner portion 3 and the door 10 are supported in the open state.

As shown in (a) of FIG. 8, the door 10 is raised when the scanner portion 3 is supported in the open state. As a result, the door 10 is rotated about the rotation center A as the center in the arrow W direction. With the rotation operation of the door 10, an end of the guide 32 of the door 10 is rotationally operated along a locus 43 in the arrow W direction. Then, the guide 32 of the door 10 and the projection 31 of the lower link 22 contact each other, so that the lower link 22 and the door 10 are flexed correspondingly to an overlapping amount of the locus 43 to move the guide 32 upward.

Further, as shown in (b) of FIG. 4, the projection (supporting member) 31 of the lower link 22 supports the guide (supported portion) 32 of the door 10. That is, the lower link 22 and the projection 31 thereof function as a limiting means (limiting member) for limiting movement of the door 10 in a closing direction. A position of the door 10 at this time is an open state position.

Then, as shown in (b) of FIG. 4, in interrelation with the rotation operation of the door 10 about the rotation center A in the arrow W direction, the pressure-releasing lever 81 is rotated about the rotation center E in an arrow G direction. Also the cam portion 83 of the pressure-releasing lever 81 is rotated, so that the cam surface 87 raises the pressing plate 95 against a spring force of the pressing spring 96. For that reason, the pressing plate 95 is rotated in an arrow H direction with the mounting hole 91, as a supporting point, of the pressing plate 95.

Here, as shown in FIG. 7, a load for rotating the pressure-releasing lever 82 becomes maximum when the point 85 on the cam surface 87 contacts the pressing plate 95. Thereafter, the pressure-releasing lever 81 is rotated until the cam surface 86 contacts the pressing plate 95 to alleviate the pressing force applied to the heating unit 64, thus releasing (eliminating) the fixing nip pressure.

(Scanner Portion Closing Operation)

An operation for returning the image forming apparatus 1 from the state in which the scanner portion 3 and the door 10 are supported in the open state to the steady-state by closing the scanner portion 3 will be described.

When the scanner portion 3 is pushed down from the state shown in (b) of FIG. 4, the scanner portion 3 is rotated about the rotation center A in an arrow Z direction, and the projection 31 of the lower link 22 is rotated about the rotation center B in an arrow U direction. The door abuts against the guide 32 and the projection 31 of the lower link 22 by a self weight thereof and then is rotated about the rotation center A in the arrow Z direction while being supported by the projection 31, so that an open angle thereof is gradually decreased. The pressure-releasing lever 81 is rotated about the rotation center E in the arrow J direction.

Incidentally, in a process in which the open angle of the door 10 is decreased while the guide 32 is supported by the projection 31, the guide 32 slides on the projection 31, while contacting the projection 31. This is clear from a positional relationship between the rotation centers A and B, the guide 32 and the projection 31, and/or a comparison of a positional relationship of the guide 32 and the projection 31 between (b) of FIG. 4, (b) of FIG. 3 and (b) of FIG. 8 described later.

Incidentally, the open angle of the door 10 shows a rotational phase of the door 10 about the rotation center A and is taken as positive with respected to a −Z direction when the open angle at the closed position (second close) of the door 10 is taken as 0 degrees. The open angle in a state in which the door 10 is supported at the open position (second open position) is about 45 degrees.

Further, as shown in (b) of FIG. 3, also the cam portion 83 of the pressure-releasing lever 81 is rotated, so that the cam surface 87 contacts the pressing plate 95. At this time, by the spring force of the pressing spring 96, the pressing plate urges the cam portion 83 in the J direction. As a result, the door 10 is urged in the Z direction (closing direction) via the lever groove 84 of the pressure-releasing lever 81 and the projection 97 of the door 10.

That is, in at least a part of a process in which the door 10 is rotated from the second open position to the second closed position, the door is supported.

As shown in (b) of FIG. 3, when the point 85 of the cam portion 83 contacts the pressing plate 95 and the open angle of the door 10 is about 15 degrees, a magnitude of a force for urging the door 10 in the Z direction (closing direction) by the pressing plate 95 becomes maximum. However, the guide 32 of the door 10 rides on the projection 31 of the lower link 22 (i.e., is supported by the projection 31), and therefore there is no fear that the door 10 is closed.

Further, when the scanner portion 3 is pushed down, as shown in (a) of FIG. 4, when the open angle of the door 10 is about 10 degrees (predetermined position), the projection 31 of the lower link 22 passes through an end portion 50 of the guide 32 of the door 10 and moves to a position where the lower link 22 cannot support the door 10. As a result, such a state that the limitation, by the projection 31, of the rotation of the door 10 in the closing direction is eliminated is formed. At this point of time, the cam portion 83 provided on the pressure-releasing lever 81 already does not contact the pressing plate 95, so that the pressing spring 96 presses the heating unit 64 in the arrow F direction via the pressing plate 95. As a result, the nip pressure is applied to the nip between the heating unit 64 and the pressing roller 65. Incidentally, when the open angle of the door 10 is less than about 12 degrees, the cam portion 83 is spaced from the pressing plate 95.

In this way, the door 10 is not supported by the projection 31, and therefore the door 10 is rotated about the rotation center A in the Z direction by the self weight thereof, thus being closed. Incidentally, the position (predetermined position) of the door 10 immediately before the supporting of the guide 32 of the door 10 is eliminated by the projection 31 of the lower link 22 is located in the neighborhood of the closed position (second closed position) of the door 10. Also, the scanner portion 3 is similarly rotated about the rotation center A in the Z direction, thus being closed.

The supporting of the guide 32 by the projection 31, i.e., the limitation, by the projection 31, of the rotation of the door 10 in the closing direction is eliminated immediately before the door 10 reaches the second closed position (i.e., in the neighborhood of the second closed position).

In this way, when the scanner portion 3 is moved from the open position (first open position) to the closed position (first closed position), the door 10 is slowly closed toward the second closed position in interrelation with the closing operation of the scanner portion 3 while being supported by the projection 31 in a section from the second open position to the predetermined position. That is, in the section from the second open position to the predetermined position, the door 10 is supported by the projection 31 and the position thereof is determined depending on the open angle of the scanner portion 3, and therefore is placed in a state in which free movement (drop due to the self weight) in the closing door is limited.

Further, when the force for urging the door 10 in the closing direction by the pressing plate 95 becomes maximum (open angle: about 15 degrees), the door 10 is located at a position between the predetermined position (open angle: about 10 degrees) and the second open position (open angle: about 45 degrees). For this reason, the movement of the door 10 in the closing direction is limited by the projection 31, so that the door 10 is prevented from quickly moving to the second closed position by the urging force of the pressing plate 95.

(Re-Opening During Closing of Scanner Portion)

An operation for opening the scanner portion 3 again during the closing of the scanner portion 3 from the state in which the scanner portion 3 and the door 10 are supported in the open state will be described.

As shown in (b) of FIG. 8, the projection 31 of the lower link 22 supports the guide 32 of the door 10. For that reason, when the scanner portion 3 is opened from this state, the projection 31 of the lower link 22 rotates about the rotation center B in the X direction along the locus 45. Then, the door 10 rotates about the rotation center A in the W direction while the guide 32 thereof contacts the projection 31 of the lower link 22, and thus gradually opens, so that both the scanner portion 3 and the door 10 are supported in the open state as shown in (b) of FIG. 4.

Accordingly, in a period in which the guide 32 of the door 10 is supported by the projection 31 of the lower link 22 (in the section from the second open position to the predetermined position), the scanner portion 3 and the door 10 perform the rotation opening and closing operation in interrelation with each other. In this section, the position of the door 10 is limited by the projection 31, so that the door 10 is placed in the state in which free movement (drop by the self weight) of the door 10 is limited. That is, when the door 10 is located at this section, the closing of the door 10 at least from the predetermined position is limited.

In this embodiment, as shown in (b) of FIG. 8, when the door 10 is located at the section from the second open position and the predetermined position, a shape of the door 10 is devised so that the door 10 can perform the rotation opening and closing operation in interrelation with the scanner portion 3. Specifically, the guide 32 is shaped to have a predetermined length (width) with respect to a radial direction about the rotation center A so that the guide 32 is always disposed on the locus 45 of the projection 31 even when the door 10 is located at any position. By using the guide 32 having such a shape, when the door 10 is located at the above section, the projection 31 can support the guide 32. Further, in place of a constitution in which the guide 32 is shaped to have the predetermined width as described above, the following constitution may also be employed. That is, the projection 31 may also be shaped to have a length (width) with respect to a radial direction about the rotation center B so that the projection 31 is always disposed on the locus 43 ((a) of FIG. 8) of the end of the guide 32 even when the door 10 is located at any position.

As described above, when the scanner portion 3 is closed from the state in which both the scanner portion 3 and the door 10 are placed in the open state, until the door 10 reaches the predetermined position in the neighborhood of the closed position, the door 10 is supported by the projection 31 of the lower link 22 and thus the closing of the door 10 from the predetermined position is limited. Then, by further closing the door 10 when the door 10 is located at the predetermined position, the supporting of the door 10 by the projection 31 of the lower link 22 is eliminated, so that the limitation of the movement of the door 10 in the closing direction is eliminated. For that reason, it is possible to prevent the drop of the door 10 from a high position in a stroke as in the conventional constitution, and therefore it is possible to reduce a degree of impact and noise when the door 10 is closed.

Further, in a period in which the guide 32 of the door 10 is supported by the projection 31 of the lower link 22, the scanner portion 3 and the door 10 perform the rotation opening and closing operation in interrelation with each other. For that reason, during the closing of the scanner portion 3 from the position where both the door 10 and the scanner portion 3 are in the open state, in the case where a user notices the recording material S for which the user forgets about performing jam clearance or in the case where the user checks whether or not the process cartridge 59 is mounted at a normal position, when the scanner portion 3 is opened again, also the door 10 is opened in interrelation with the scanner portion 3 and thus usability is improved. Such an effect is conspicuously obtained by setting a position (open angle=about 10 degrees), where the interrelated opening and closing operation of the door 10 with the scanner portion 3 is eliminated, at a position, of the fully open position (open angle=about 45 degrees) of the door 10 and the closed position of the door 10, closer to the closed position. That is, in this embodiment, the open angle at the position where the interrelated opening and closing operation of the door 10 with the scanner portion 3 is eliminated (i.e., at the position where the supporting by the projection 31 of the lower link 22 is eliminated) may only be required to be set at a value of a half or less of the open angle at the fully open position of the door 10.

When the scanner portion 3 is further closed from the state in which both the scanner portion 3 and the door 10 are in the open state, a pressure-releasing mechanism of the fixing unit 62 urges the door 10 in the closing direction, and thereafter does not urge the door 10 at the open angle of about 12 degrees. Thereafter, at the open angle of about 10 degrees, the supporting of the door 10 by the projection 31 of the lower link 22 is eliminated.

For this reason, it is possible to prevent quick closing of the door 10 by the urging of the pressure-releasing mechanism, and therefore it is possible to prevent the impact and the noise generated when the door 10 is closed.

Incidentally, timing when the supporting of the door 10 by the projection 31 of the lower link 22 may also be immediately after the open angle of the door 10 is about 15 degrees where a maximum force for urging the door 10 in the closing direction is applied from the pressure-releasing mechanism of the fixing unit 62. However, in the case where the supporting of the door 10 is eliminated after a state in which the pressure-releasing mechanism does not urge the door 10 at the open angle of about 10 degrees is formed, it is possible to completely prevent closing momentum of the door 10, and therefore such a case is more preferable.

Further, in this embodiment, the constitution in which the door 10 presses the pressing plate 95 of the pressure-releasing mechanism of the fixing unit 62 was employed. However, even in a constitution in which the door 10 is closed by the self weight thereof without receiving the urging force from the pressing plate 95, the effect in this embodiment can be obtained. As in this embodiment, in the case where the door 10 is formed with a resin-made member constituting an upper surface portion of an outer casing cover of the printer portion 2 provided with no damper or the like, the open angle of the door 10 when the supporting of the door 10 is eliminated may only be required to be about 20 degrees or less. That is, the open angle of the door 10 when the supporting of the door 10 is eliminated is set at about 20 degrees or less, whereby it is possible to sufficiently reduce a degree of the impact and the noise when the door 10 is closed, and therefore the effect in this embodiment can be obtained.

<Second Embodiment>

Figure 9:
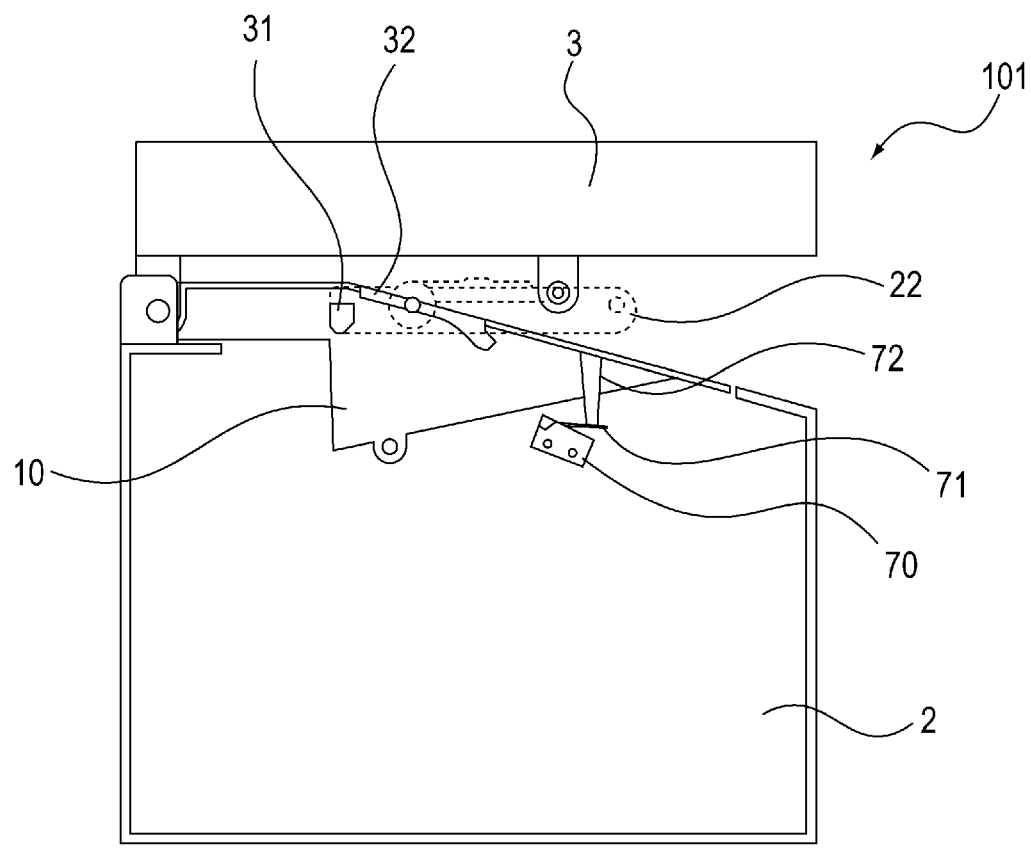
FIG. 9 is a schematic view of an image forming apparatus in Second Embodiment.

FIG. 9 is a schematic view of an image forming apparatus 101 in this embodiment according to the present invention. In the following, only a characteristic portion of the image forming apparatus 101 is described, and other constitution and actions of the image forming apparatus 101 are the same as those in the image forming apparatus 1 in First Embodiment. Therefore, portions identical or similar to those of the image forming apparatus 1 in First Embodiment are represented by the same reference numerals or symbols and will be omitted from redundant description.

(Constitution of ON/OFF Control of Printer Portion)

The printer portion 2 includes an interlock switch 70 for switching an operation of a controller of the printer portion 2 in an ON/OFF manner. The interlock switch 70 is connected with the controller (not shown), of the printer portion 2, provided in the printer portion 2. By turning on and off this interlock switch 70, the operation of the printer portion 2 controlled in the ON/OFF manner.

The door 10 is provided with an interlock switch projection 72 for pushing down a switch lever 71 of the interlock switch 70. In a state in which the door 10 is closed as shown in FIG. 9, the interlock switch projection 72 presses down the switch lever 71, so that the interlock switch 70 is placed in CN state, i.e., the printer portion 2 is placed in an operation state.

The interlock switch 70 and the interlock switch projection 72 constitute an operation stopping means.

(Opening and Closing Operation)

Figure 10:
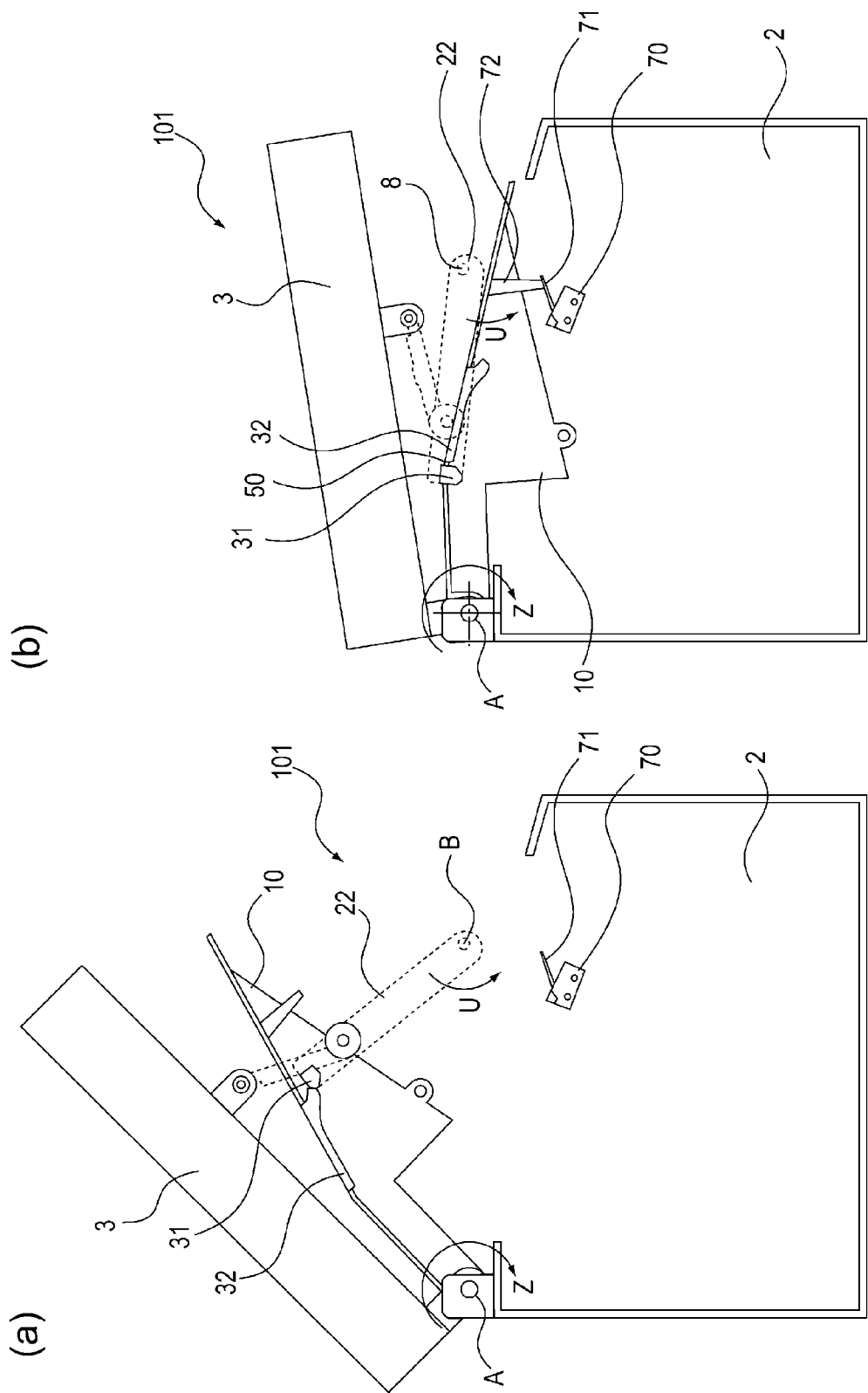
In FIG. 10, (a) and (b) are schematic views showing a state in which a door of the image forming apparatus shown in FIG. 9 is open.

In FIG. 10, (a) and (b) are schematic views each showing a state of the image forming apparatus 101 in a state in which the door 10 is open. In FIG. 10, (a) shows a state in which the scanner portion 3 is fully open and in which the door 10 is supported in the open state, and (b) shows a state in which the scanner portion 3 is closed halfway from the state of (a) of FIG. 10.

As shown in (a) of FIG. 10, when the open angle of the door 10 is about 2 degrees, the interlock switch projection 72 is separated from the switch lever 71, so that the interlock switch 70 is in OFF state, i.e., the image forming operation of the printer portion 2 is in a rest (stop) state. For that reason, the user can safely access to the inside of the printer portion 2, and it is possible to prevent occurrences of image defect and jam by printing in a state in which the door 10 is open.

An operation for closing the scanner portion 3 from the state in which the scanner portion 3 and the door 10 are supported in the open state in order to return the image forming apparatus 101 to the steady-state will be described.

When the scanner portion 3 is pushed down as shown in (a) of FIG. 10, the scanner portion 3 is rotated about the rotation center A in the arrow Z direction, and the projection 31 of the lower link 22 is moved about the rotation center B in the arrow U direction. The door 10 is rotated about the rotation center A in the arrow Z direction while the guide 32 contacts the projection 31 of the lower link 22. In a state in which the guide 32 of the direction 10 is supported by the projection 31 of the lower link 22, the interlock switch 70 is still placed in the OFF state.

When the scanner portion 3 is further pressed down, as shown in (b) of FIG. 10, at the time when the projection 31 of the lower link 22 passes through the end portion 50 of the guide 32, there is no support for the door 10, so that the door 10 is rotated about the rotation center A in the arrow Z direction by the self weight thereof, thus being closed. Here, as shown in (b) of FIG. 10, the position (predetermined position) of the door 10 immediately before the supporting of the guide 32 of the door 10 is eliminated by the projection 31 of the lower link 22 is located in the neighborhood of the closed position (second closed position) of the door 10.

Then, after start of the drop of the door 10 and before the door 10 is closed, the interlock switch projection 72 provided on the door pushes down the switch lever 71 of the interlock switch 70, so that the interlock switch 70 is placed in ON state. Also, the scanner portion 3 is similarly rotated about the rotation center A in the Z direction, thus being closed.

In this way, in a non-steady state in which the door 10 is supported by the projection 31 of the lower link 22 and is halfway opened, the interlock switch 70 is turned off. In a state in which the door 10 is further closed, the interlock switch 70 is turned on.

Incidentally, the open angle (about 10 degrees) at a position where the limitation of the door 10 is eliminated is larger than the open angle (about 2 degrees) at an operation stop position where the image forming operation of the printer portion 2 is stopped. That is, the interlock switch 70 is turned on so that the stopped operation of the printer portion 2 is restored after the limitation of the door 10 is eliminated by the projection 31 at the open angle of 10 degrees or less and then the door 10 starts closing thereof by the self weight thereof.

In this way, it is possible to prevent the printer portion 2 from intentionally operating in the non-steady state during the closing operation of the scanner portion 3. As a result, it is possible to prevent the occurrences of the image defect and the jam by printing in the non-steady state.

Further, even in a state in which the scanner portion 3 is held in the open state, if the door 10 is in the closed state, the printer portion 2 is openable. For that reason, when an operation for taking out the recording material P, with respect to the feeding direction, from the discharge-mounting portion is performed, the scanner portion 3 is opened, thus permitting easy access to the discharge-mounting portion.

Further, similarly as in First Embodiment, the supporting of the door 10 is eliminated after the door 10 reaches the neighborhood of the closed position thereof, and therefore it is possible to reduce the degree of the impact and the noise when the door 10 is closed.

In this embodiment, the operation of the printer portion 2 is turned on and off by turning the interlock switch 70 on and off, but also the operation of the scanner portion 3 may also be turned on and off by the interlock switch 70.

<Third Embodiment>

Figure 11:
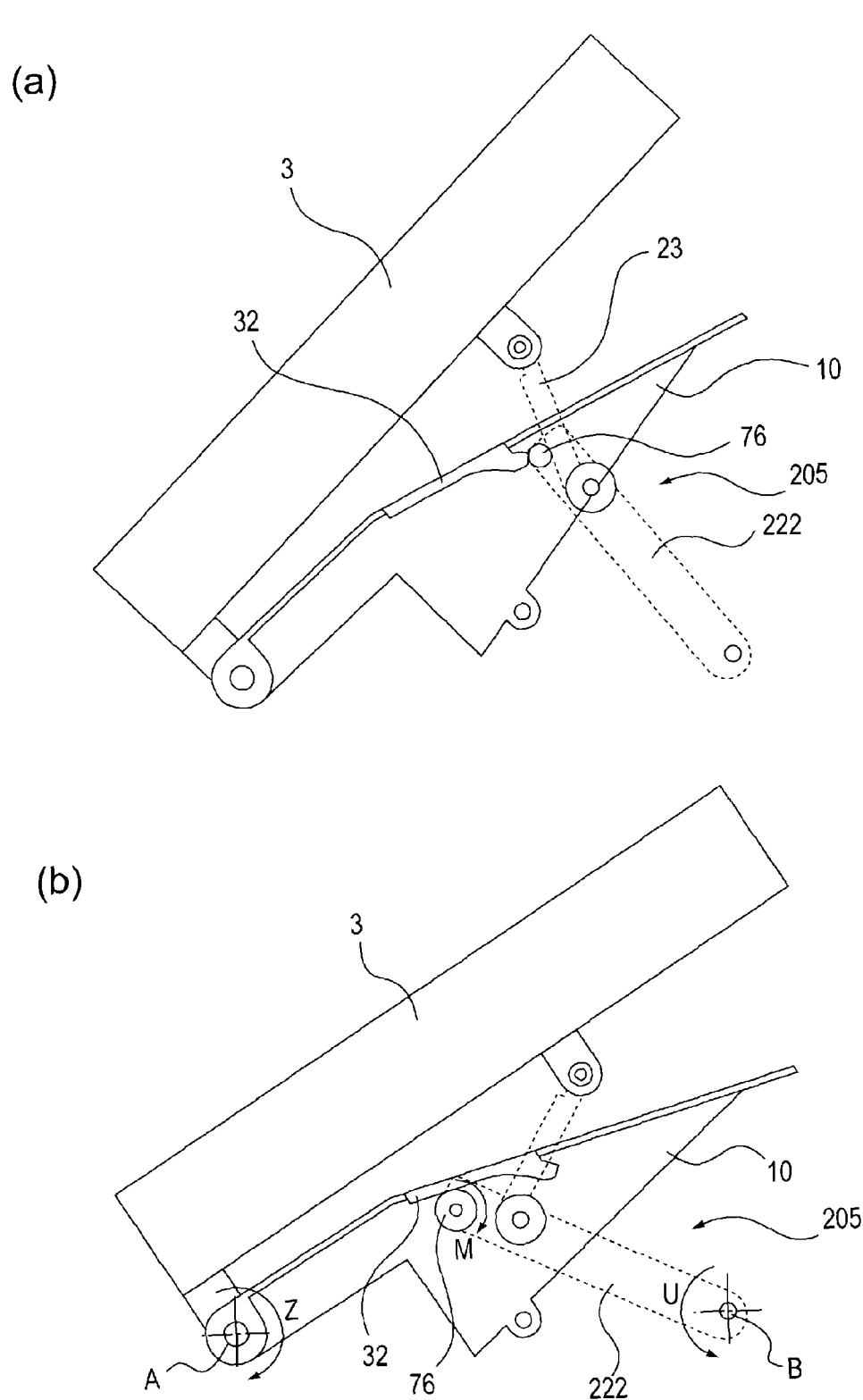
In FIG. 11, (a) and (b) are schematic views showing a structure of a rotatable opening and closing mechanism of an image forming apparatus in Third Embodiment.

In FIG. 11, (a) and (b) are schematic views showing a structure of a rotatable opening and closing mechanism of an image forming apparatus in this embodiment according to the present invention. In FIG. 11, (a) shows a fully open state of the scanner portion and the door, and (b) shows a halfway closed state of the scanner portion and the door. In the following, only a characteristic portion of the image forming apparatus 101 is described, and other constitution and actions of the image forming apparatus 101 are the same as those in the image forming apparatus 1 in First Embodiment. Therefore, portions identical or similar to those of the image forming apparatus 1 in First Embodiment are represented by the same reference numerals or symbols and will be omitted from redundant description.

(Rotation Opening and Closing Mechanism for Scanner Portion and Door)

Figure 12:
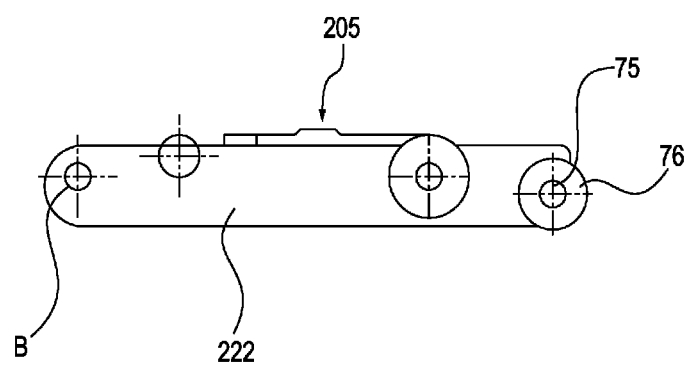
FIG. 12 is a schematic view showing a structure of a scanner link member used in the rotatable opening and closing mechanism shown in FIG. 11.

FIG. 12 is a schematic view showing a structure of a scanner link member 205 used in the rotatable opening and closing mechanism shown in FIG. 11.

As shown in FIG. 12, the scanner link member 205 is provided, at an end of a lower link 222 in a side opposite from a rotation center B of the lower link 222, while a roller 76 which is projected in the direction of the door 10 and which is used as a supporting portion for supporting the door 10 is provided. The roller 76 is rotatably mounted to a boss 75 of the lower link 222.

For this reason, when the guide 32 of the door 10 is supported by the roller 76 of the scanner link member 205, the guide 32 and the roller 76 are constituted so that the guide 32 can support the door 10 by rolling-contact between the guide 32 and the roller 76.

(Opening and Closing Operation)

An operation for closing the scanner portion 3 from the state ((a) of FIG. 11) in which the scanner portion 3 and the door 10 are supported in the open state will be described.

When the scanner portion 3 is pushed down as shown in (b) of FIG. 11, the scanner portion 3 is rotated about the rotation center A in the arrow Z direction, and the roller 76 of the scanner link member 205 contacts the guide 32 of the door 10 and is rotated about the rotation center B in the arrow U direction while rolling in an arrow M direction. The door 10 is rotated about the rotation center A in the arrow Z direction while being supported by the rolling roller 76.

In this way, the guide 32 and the roller 76 cause the rolling contact therebetween, and therefore, compared with the case of rubbing therebetween, a frictional resistance becomes small. As a result, an operational force of the opening and closing operation of the scanner portion 3 and the door 10 becomes small, and a rubbing noise from the contact portion between the guide 32 and the roller 76 is reduced, so that usability is improved.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application Nos. 071813/2013 filed Mar. 29, 2013, and 056388/2014 filed Mar. 19, 2014, which are hereby incorporated by reference herein in their entirety.

What is claimed is:

1. An image forming apparatus comprising:
    an image forming portion for forming an image on a recording material;
    an image reading portion for reading an original image, wherein said image reading portion is movable between a first open position where said image reading portion opens access to said image forming portion and a first closed position where said image reading portion closes access to said image forming portion;
    an openable member movable between a second open position where said openable member opens access to an inside of said image forming portion and a second closed position where said openable member closes access to the inside of said image forming portion; and
    a supporting member for supporting said openable member,
    wherein when said image reading portion is located at the first open position, said openable member is supportable at the second open position,
    wherein when said image reading portion is moved toward the first closed position from a state in which said openable member is supported at the second open position by said supporting member, closing of said openable member from a predetermined position, which is between the second open position and the second closed position and which is closer to the second closed position than the second open position, is limited by said supporting member, and
    wherein when said image reading portion is moved toward the first closed position from a state in which the closing of said openable member from the predetermined position is limited by said supporting member, limitation of said openable member by said supporting member is eliminated.

2. An image forming apparatus according to claim 1, wherein when said openable member is located between the second open position and the predetermined position, said openable member is movable between the second position and the predetermined position in interrelation with movement of said image reading portion by support thereof by said supporting member.

3. An image forming apparatus according to claim 1, further comprising:
    urging means for urging said openable member in a closing direction in at least a part of a process in which said openable member is moved from the second open position to the second closed position,
    wherein a position where an urging force for urging said openable member in the closing direction by said urging means is maximum is located between the predetermined position and the second open position.

4. An image forming apparatus according to claim 3, wherein when said openable member is located at the predetermined position, said urging means does not urge said openable member in the closing direction.

5. An image forming apparatus according to claim 3, wherein said image forming portion includes fixing means for fixing a toner image on the recording material,
    wherein said urging means urges, when said openable member is located at the second closed position, said openable member so as to be placed in a pressing state in which said fixing means is capable of applying pressure to the recording material, and eliminates the pressing when said openable member is located at the second open position.

6. An image forming apparatus according to claim 1, further comprising:
operation stopping means for stopping an operation of said image forming portion,
wherein said operation stopping means places the operation of said image forming portion in a rest state when said openable member is located at a position where said openable member opens access to the inside of said image forming portion more than at an operation stopping position.

7. An image forming apparatus according to claim 6, wherein the operation stopping position is located between the predetermined position and the second closed position.

8. An image forming apparatus according to claim 1, further comprising:
a link member, provided so as to connect said image forming portion and said image reading portion, movable in interrelation with rotation of said image reading portion,
wherein said supporting member is provided on said link member.

9. An image forming apparatus according to claim 1, wherein said openable member includes a supported portion supported by said supporting member, and said supported portion has a shape such that said supported portion is disposed on a movement locus of said supporting member when said openable member is located between the second open position and the predetermined position.

10. An image forming apparatus according to claim 8, wherein said supporting member is a roller rotatable relative to said link member.

11. An image forming apparatus according to claim 1, wherein said openable member is rotated to move between the second closed position and the second open position, and an angle of rotation of said openable member for being moved from the second closed position to the predetermined position is 20 degrees or less.

12. An image forming apparatus comprising:
an image forming portion for forming an image on a recording material;
an image reading portion for reading an original image, wherein said image reading portion is movable between a first open position where said image reading portion opens access to said image forming portion and a first closed position where said image reading portion closes access to said image forming portion;
an openable member movable between a second open position where said openable member opens access to an inside of said image forming portion and a second closed position where said openable member closes access to the inside of said image forming portion;
a supporting member for supporting said openable member; and
urging means for urging said openable member in a closing direction in at least a part of a process in which said openable member is moved from the second open position to the second closed position,
wherein when said image reading portion is located at the first open position, said openable member is supportable at the second open position,
wherein when said image reading portion is moved toward the first closed position from a state in which said openable member is supported at the second open position by said supporting member, closing of said openable member from a predetermined position which is between the second open position and the second closed position is limited by said supporting member,
wherein when said image reading portion is moved toward the first closed position from a state in which the closing of said openable member from the predetermined position is limited by said supporting member, limitation of said openable member by said supporting member is eliminated, and
wherein a position where an urging force for urging said openable member in the closing direction by said urging means is maximum is located between the predetermined position and the second open position.

13. An image forming apparatus according to claim 12, wherein when said openable member is located at the predetermined position, said urging means does not urge said openable member in the closing direction.

14. An image forming apparatus according to claim 12, wherein when said openable member is located between the second open position and the predetermined position, said openable member is movable between the second position and the predetermined position in interrelation with movement of said image reading portion by support thereof by said supporting member.

15. An image forming apparatus according to claim 12, wherein said image forming portion includes fixing means for fixing a toner image on the recording material,
wherein said urging means urges, when said openable member is located at the second closed position, said openable member so as to be placed in a pressing state in which said fixing means is capable of applying pressure to the recording material, and eliminates the pressing when said openable member is located at the second open position.

16. An image forming apparatus according to claim 12, further comprising:
operation stopping means for stopping an operation of said image forming portion,
wherein said operation stopping means places the operation of said image forming portion in a rest state when said openable member is located at a position where said openable member opens access to the inside of said image forming portion more than at an operation stopping position.

17. An image forming apparatus according to claim 16, wherein the operation stopping position is located between the predetermined position and the second closed position.

18. An image forming apparatus according to claim 12, further comprising:
a link member, provided so as to connect said image forming portion and said image reading portion, movable in interrelation with rotation of said image reading portion,
wherein said supporting member is provided on said link member.

19. An image forming apparatus according to claim 12, wherein said openable member includes a supported portion supported by said supporting member, and said supported portion has a shape such that said supported portion is disposed on a movement locus of said supporting member when said openable member is located between the second open position and the predetermined position.

20. An image forming apparatus according to claim 12, wherein said openable member is rotated to move between the second closed position and the second open position, and an angle of rotation of said openable member for being moved from the second closed position to the predetermined position is 20 degrees or less.

21. An image forming apparatus according to claim 1, wherein said openable member is supported by said supporting member when said openable member is located at the second open position.

22. An image forming apparatus according to claim 12, wherein said openable member is supported by said supporting member when said openable member is located at the second open position.

* * * * *